(12) United States Patent
Gruber et al.

(10) Patent No.: US 12,711,800 B2
(45) Date of Patent: Aug. 18, 2026

(54) METHOD AND DEVICE FOR AUTOMATIC ANALYSIS OF A CIRCUIT DIAGRAM

(71) Applicant: EPLAN GMBH & CO. KG, Monheim Am Rhein (DE)

(72) Inventors: Thiemo Gruber, Ratingen (DE); Vincent Layes, Gelsenkirchen (DE); Alexander Peters, Langenfeld (DE); Marcus Reitz, Hofheim/Taunus (DE)

(73) Assignee: EPLAN GMBH & CO. KG, Monheim Am Rhein (DE)

( * ) Notice: Subject to any disclaimer, the term of this patent is extended or adjusted under 35 U.S.C. 154(b) by 266 days.

(21) Appl. No.: 18/279,633

(22) PCT Filed: Jan. 10, 2022

(86) PCT No.: PCT/DE2022/100004
§ 371 (c)(1),
(2) Date: Aug. 31, 2023

(87) PCT Pub. No.: WO2022/207027
PCT Pub. Date: Oct. 6, 2022

(65) Prior Publication Data

US 2024/0312236 A1 Sep. 19, 2024

(30) Foreign Application Priority Data

Mar. 31, 2021 (DE) ..................... 10 2021 108 281.1

(51) Int. Cl.
*G06V 30/422* (2022.01)
*G06F 30/31* (2020.01)
*G06F 111/12* (2020.01)

(52) U.S. Cl.
CPC ............ *G06V 30/422* (2022.01); *G06F 30/31* (2020.01); *G06F 2111/12* (2020.01)

(58) Field of Classification Search
USPC .......................................................... 382/113
See application file for complete search history.

(56) References Cited

U.S. PATENT DOCUMENTS 5,251,268 A 10/1993 Colley et al.
6,606,731 B1 8/2003 Baum et al.
(Continued)

OTHER PUBLICATIONS

International Search Report (English and German) and Written Opinion of the ISA (German) issued in PCT/DE2022/100004, mailed May 3, 2022; ISA/EP.
(Continued)

*Primary Examiner* — Jacky X Zheng
(74) *Attorney, Agent, or Firm* — Harness, Dickey & Pierce, P.L.C.

(57) ABSTRACT

The invention relates to a method for automatic analysis of a circuit diagram, comprising:
- applying one or more filters to a circuit diagram for recognizing a circuit symbol defined by the respective filter in the circuit diagram;
- applying one or more detectors to the circuit diagram for recognizing connections between the circuit symbols;
- determining those recognized circuit symbols which are coupled to one another by means of the recognized connections; and
- for each of the recognized circuit symbols, storing an indication in a data structure of the recognized circuit symbol of each further circuit symbol coupled to this recognized circuit symbol.

Furthermore, a corresponding device is described.

11 Claims, 3 Drawing Sheets

(56) References Cited

U.S. PATENT DOCUMENTS

| | | | | |
|---|---|---|---|---|
| 6,678,873 | B1 * | 1/2004 | Kohashi | G06F 30/30 716/102 |
| 7,587,061 | B1 | 9/2009 | Pacenti | |
| 2003/0061585 | A1 * | 3/2003 | Matsumoto | G06F 30/30 716/114 |
| 2010/0250622 | A1 | 9/2010 | Hossenlop | |
| 2017/0169291 | A1 * | 6/2017 | Held | G06V 30/422 |
| 2017/0177757 | A1 | 6/2017 | Thorley et al. | |
| 2023/0153512 | A1 * | 5/2023 | Shapira | G01R 31/2848 716/112 |

OTHER PUBLICATIONS

German International Preliminary Report on Patentability issued in PCT/DE2022/100004, dated Jun. 22, 2023.

Bunke H et al. "Understanding of circuit diagrams by means of probabilistic relaxation", Signal Processing, Elsevier, Amsterdam, NL, vol. 4, No. 2-3, Apr. 1, 1982 (Apr. 1, 1982), pp. 169-180, [retrieved on Apr. 1, 1982], DOI: 10.1016/0165-1684(82)90019-6, ISSN: 0165-1684, XP024231456.

Kim S H et al. "Recognition of Logic Diagrams by Identifying Loops and Rectilinear Polylines", Document Analysis and Recognition, 1993., Proceedings of the Second International Conference on Tsukuba Science City, Japan Oct. 20-22, 1993, Los Alamitos, CA, USA, IEEE Comput. Soc, Oct. 20, 1993 (Oct. 20, 1993), pp. 349-352, DOI: 10.1109/ICDAR.1993.395717, ISBN: 978-0-8186-4960-8. XP010135761.

"Template Matching", Wikipedia, Nov. 2020, 6 Pages.

S. Mani et al., "Automatic Digitization of Engineering Diagrams Using Deep Learning and Graph Search", Oct. 31, 2025, 8 Pages.

Referenz (Programmierung), Wikipedia, Oct. 31, 2025, with English abstract (5 Pages).

Segmentierung (Bildverarbeitung), Wikipedia, Oct. 31, 2025, with English abstract (9 Pages).

* cited by examiner

METHOD AND DEVICE FOR AUTOMATIC ANALYSIS OF A CIRCUIT DIAGRAM

CROSS-REFERENCE TO RELATED APPLICATIONS

This application is a U.S. National Phase Application under 35 U.S.C. 371 of International Application No. PCT/DE2022/100004, filed on Jan. 10, 2022, which claims the benefit of German Patent Application No. 10 2021 108 281.1, filed on Mar. 31, 2021. The entire disclosures of the above applications are incorporated herein by reference.

BACKGROUND

This section provides background information related to the present disclosure which is not necessarily prior art.

TECHNICAL FIELD

The invention is in the field of automatic analysis of a circuit diagram, in particular image-based recognition and interpretation of circuit symbols and their function.

DISCUSSION

A circuit diagram, also referred to as a wiring diagram, represents an electrical circuit with graphical means. These graphical means comprise symbols for the illustrated components of the circuit, referred to here as switching symbols or switching elements. Circuit diagrams reproduce certain technical properties of the circuit but suppress others. The reproduced properties are, for example, the types of the imaged components and the coupling with other components via inputs and outputs. The suppressed properties are, for example, the real arrangement and shape of the components. On account of this abstract illustration and the sometimes-high complexity of imaged circuits, these are often difficult for the viewer to understand.

The switching symbols are often standardized; at least identical switching symbols are used for identical or similar components in a circuit diagram. In addition, connections between components are shown by means of straight lines.

U.S. Pat. No. 7,587,061 B1 discloses a method for analysis of design drawings of buildings. Users first select an imaged symbol ("lassoing"), which is stored and used to identify similar symbols.

U.S. Pat. No. 5,251,268 discloses automatic recognition of text and graphics elements in a template. Filters are used to identify certain elements.

SUMMARY

This section provides a general summary of the disclosure and is not a comprehensive disclosure of its full scope or all of its features.

It is one aspect of the invention to provide an automatic interpretation of components of a graphically illustrated circuit with technical means and enabling observers of the circuit to understand these components and their function.

Embodiments of the invention relate to methods for automatic analysis of a circuit diagram, comprising: applying one or more filters to a circuit diagram for recognizing a circuit symbol defined by the respective filter in the circuit diagram; applying one or more detectors to the circuit diagram for recognizing connections between the circuit symbols; determining those recognized circuit symbols which are coupled to one another by means of the recognized connections; and for each of the recognized circuit symbols, storing an indication in a data structure of the recognized circuit symbol of each further circuit symbol coupled to this recognized circuit symbol.

The methods preferably further comprise: generating a natural language formulation from one of the data structures, wherein the natural language formulation specifies a function of one of the recognized circuit symbols which is exerted by the circuit symbol on the circuit symbols coupled to this circuit symbol, or which are exerted on the circuit symbol by the circuit symbols coupled to this circuit symbol.

In particular, the function of a circuit symbol is predefined in the data structure, wherein a function which is exerted on this circuit symbol by a coupled circuit symbol is determined by looking up this function in the data structure of the coupled circuit symbol.

The filter is preferably a grayscale image or a bitmap which represents corners of a symbol as gray values or as set bits.

The methods can further comprise producing the one or more filters to identify a respective circuit symbol, wherein producing a filter comprises: applying one or more edge detectors to a representation of a circuit symbol to highlight horizontal, vertical and diagonal edges; and determining end points of the horizontal, vertical and diagonal edges, and storing a corresponding bit or a corresponding gray value in a bitmap or a grayscale image as a resulting filter.

The methods advantageously further comprise classifying the recognized circuit symbols after applying the filters.

According to a particular embodiment, the user can be prompted to make a selection from a plurality of circuit symbols whose filters indicate the presence of these circuit symbols at a location in the circuit diagram.

The methods can further comprise identifying a technical discipline of the circuit diagram contained in a document containing the circuit diagram and determining a set of circuit symbols and associated filters associated with the technical discipline to be used for automatic analysis of the circuit diagram.

In particular, the one or more detectors are edge detectors.

The indication is preferably a pointer.

According to an embodiment, the indication is stored for recognized circuit symbols directly coupled to a recognized circuit symbol.

Alternatively, or additionally, the indication can be stored for recognized circuit symbols indirectly coupled to a recognized circuit symbol.

Further embodiments relate to a computer-readable medium having instructions stored thereon which, when executed by a processor, carry out one of the aforementioned methods.

Further embodiments comprise a device comprising: a memory; and a processor coupled to the memory and configured to carry out one of the aforementioned methods.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
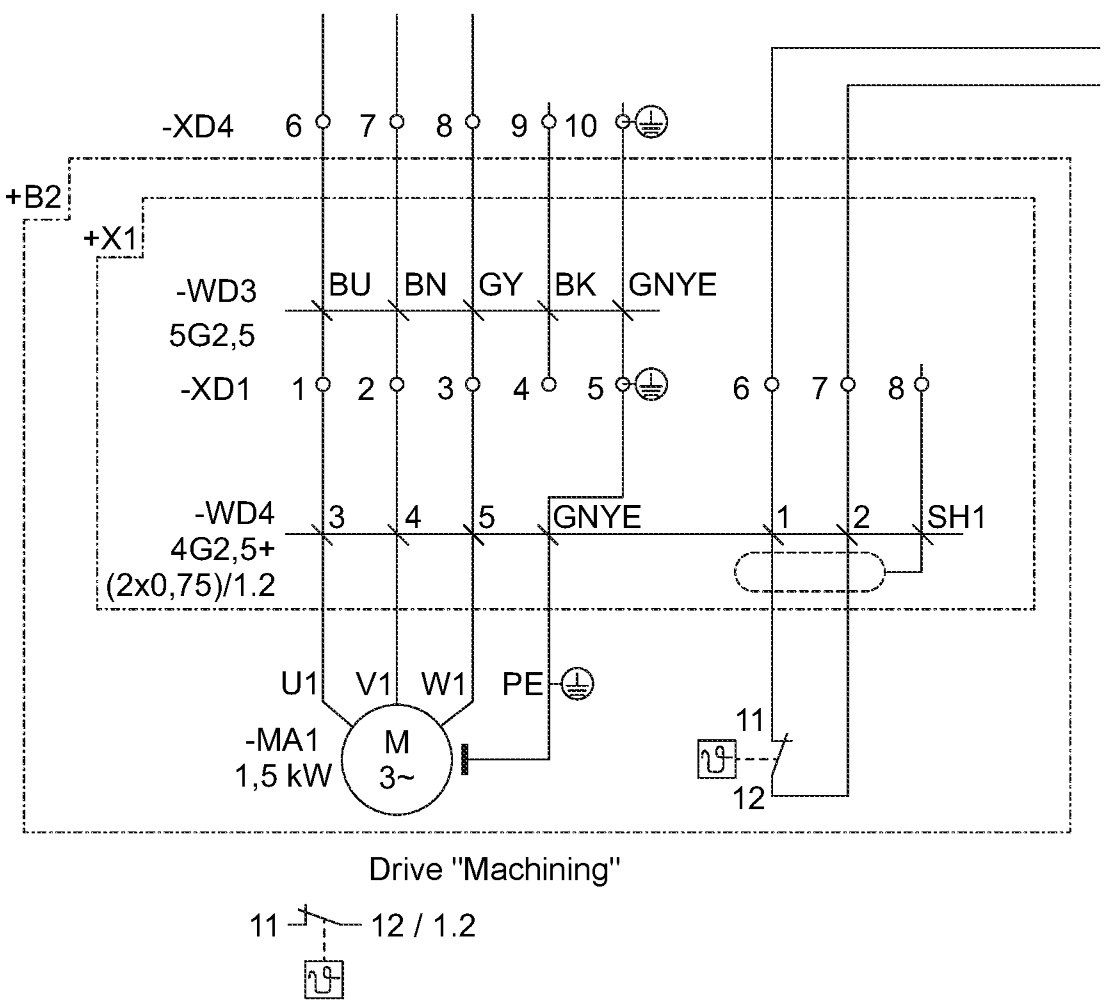
FIG. 1 shows by way of example a circuit diagram as an input for embodiments of the invention.

The invention uses techniques of image processing to recognize components in a circuit diagram and to interpret their function and connections and stores this information in data structures which can be used for further illustrations, for example natural language reproduction. In particular, the invention enables users to select individual components in a graphical reproduction of a circuit diagram and to inform themselves in a targeted manner about their properties and functions in the imaged circuit.

In one embodiment, the method comprises applying filters to a circuit diagram to recognize imaged circuit symbols. In image processing, a filter is understood to mean an operand which is suitable for amplifying or generally transforming certain structures in the image when multiplied by an image, for example a two-dimensional raster illustration. A filter which serves to identify a certain object in an image is, in a simple form, a mask (matrix, bitmap), the fields of which are occupied by 0 or 1 or else by real numbers and thereby indicate the contours of the object to be identified. In particular, an image of this object can simply be used as a filter for an object to be identified, or a filter can be generated automatically from such an image by means of applying edge detectors, in particular detectors for horizontal, vertical and diagonal edges. In a particular example, only the end points and/or corner points of such edges are stored in a resulting filter. Filters can also be predefined and linked to further information about the illustrated switching element, for example manufacturer, connections, exerted function, etc.

The multiplication of a filter by an image can be carried out as a matrix multiplication, the result values being stored in a result image. If the multiplication of the filter by the image at one point leads to a particularly high value (objects in the original with a higher value than the background), this indicates the presence of the object to be identified at this point. In order that these results are realistic, filter and image should preferably use identical or similar values (binary values, gray values, colour values) for the same structures; for example, the values for the background of the filter should correspond to the background value in the image.

The application of the filter to the image is also referred to as convolution or convolution. As an alternative to a matrix multiplication, it can also be carried out by means of transformation into a frequency domain, for example by means of Fourier transformation.

The circuit diagram to be analyzed is preferably present in the form of a two-dimensional raster illustration. If the circuit diagram is present in a vector format, a raster illustration can readily be determined in a predetermined resolution. The resolutions of the circuit symbols stored in the filters are preferably matched to the resolution of the raster illustration, in particular identical (circuit symbol in the filter appears in the same pixel dimensions as in the circuit diagram).

The convolution is repeated for all types of switching elements which are to be recognized in the image, wherein a separate filter is used for each of these types and an associated result image is generated. Examples of a type of a component are resistor, coil, capacitor. A plurality of components of a type can occur in an image.

The present embodiment further comprises an examination of the result images with the aim of recognizing the specific locations in the circuit diagram at which the recognized objects are present. An analysis for extreme values in the result image is suitable for this purpose. If objects appear in the original image with higher values than the other image regions (background), the analysis is a maxima analysis. For example, the local maximum values of the result image can be detected by using a maximum filter. The analysis for maxima can be restricted by a previously known number of objects of this type in the circuit diagram, if known, or by a minimum distance between two objects and thus between adjacent maxima. The maxima can furthermore be selected on the basis of a threshold value of the maxima; for example, the multiplication of the object filter by itself can result in a theoretical maximum value, and a threshold value for assessing a maximum in the result image can denote a certain percentage value of this maximum value. The examples mentioned can be used analogously for minima analyses (objects appear darker than the background). For the sake of simplicity, a maxima analysis is always mentioned below, which can be replaced by a minima analysis depending on the input material.

After this examination, the locations in the circuit diagram at which objects of the different object types or the different switching symbols have been determined are known.

In a further step, the embodiment comprises determining connections between the illustrated circuit symbols. In circuit diagrams, such connections are usually illustrated exclusively by horizontal and vertical lines, sometimes also by diagonal or arbitrarily inclined lines. To recognize the connections, the invention therefore uses edge filters for horizontal lines and edge filters for vertical lines, optionally also edge filters for diagonal or arbitrarily inclined lines, and stores the results of this convolution in respective result images. Since the circuit symbols themselves can likewise contain such lines, measures must be taken in order not to incorrectly detect these lines of the circuit symbols as connection lines. For example, before determining the connections in the circuit diagram, the previously recognized circuit symbols can be removed from the circuit diagram, for instance by subtracting the corresponding filters from the circuit diagram. Alternatively, a rectangular region can be set to the background value in the circuit diagram around each maximum.

Thus, a respective result image is present for each type of edge filter (horizontal, vertical, etc.), which contains the corresponding connection lines and/or parts thereof. These lines are vectorized, so that the two end points are fixed for each of the lines. Before these lines can be identified as connections between two components, they are optionally to be put together and to be assigned with their final two end points to two of the switching elements in the circuit diagram.

For this purpose, in one embodiment, each of the already determined maxima is considered one after the other and that one is selected from the detected lines which has the end point closest to the maximum. If a plurality of inputs or outputs are distinguished in the circuit symbol associated with this maximum, their connection points are taken into account instead of the maximum. The set of inputs and outputs can have been defined by the user by means of interaction with the filter (selection of the connection points). The other end point of the selected line is compared with all other line end points and maxima (connection points) and the closest of these points is selected. If a maximum or a connection point is involved, the connection is complete. In this case, a data structure is created or updated, so that it contains entries for each of the two objects which correspond to the two maxima, and each of these entries contains an indication, for example a pointer variable, of the respective other object. The data structure is thus suitable for determining which objects are connected to other objects. If, however, the closest point is not a maximum (connection point), but the end point of a further one of the lines, the method is again continued with the second end point of this further line and searched again for the closest maximum (connection point) or line end point. This is repeated until a maximum (connection point) has been found as the closest point. The method concludes with the updating of the data structure already explained.

As an alternative to the described approach for determining the connections between circuit symbols, the result images with detected lines can also be combined by means of an AND operation and the result vectorized and then the end points are determined and associated with the maxima (connection points). In these and further alternatives, possibly occurring problems, for instance branching of the lines, can be solved by measures well known to the person skilled in the art; such artifacts or special cases do not impede the feasibility of the described alternatives.

The invention thus provides a data structure which contains an entry for each of the objects. This entry can contain various information on the respective object, in particular the type of circuit symbol (given by the underlying filter of this circuit symbol) and the further circuit symbols coupled to this circuit symbol by means of connection lines. Further information can also be considered as details on the inputs and outputs of the circuit symbols; for this purpose, it can already be established during the determination of the lines emanating from this circuit symbol whether these are present at an input or output or other connection of the circuit symbol. The number and the types of these inputs and outputs or connections can be fixed from the outset by the respective circuit symbol.

The data structure can contain in each entry/for each circuit symbol indications, pointer variables, etc. of further circuit symbols; in addition to the already mentioned indications of circuit symbols which are directly coupled to a relevant circuit symbol via a connection, this can also comprise indirectly coupled circuit symbols which are coupled to the relevant circuit symbol only via further other circuit symbols. Such information can be readily determined from the data structure, for example by following, starting from a first circuit symbol entry, the indications of further circuit symbols and their own indications.

Furthermore, the data structure can also contain in the mentioned entries identifiers which are recognized in the circuit diagram in the immediate vicinity of the circuit symbols. For this purpose, a text recognition (OCR) can be carried out in each recognized circuit symbol, the result of which is stored in the entry of this circuit symbol in the data structure. For example, circuit diagrams often contain assigned names of the individual symbols, which are detected and secured in this way.

The data structure constructed in this way can be used to determine individual functions of the circuit. In a particular embodiment, a graphical user interface which again represents the original circuit diagram is generated on the basis of the data structure. The individual circuit symbols can be selected by the user by keyboard commands, mouse or touchpad actions or via a touch-sensitive display. Information on the circuit symbol can then be displayed to the user or transmitted acoustically on the basis of the data structure. For example, a natural language formulation can be automatically generated from these data and played, which informs the user about the type of the circuit symbol, the further circuit symbols connected to this circuit symbol, and the function of the circuit symbol with respect to the further circuit symbols, for example on the basis of information about to which connections of the circuit symbol the other circuit symbols are coupled, and on the basis of information about the types of the other circuit symbols. For this purpose, the function of the circuit symbol can be read from the data structure, and it can be determined which function is exerted by the circuit symbol on the other circuit symbols and vice versa.

The data structure can in this respect also support the maintenance of a circuit by information on selected circuit symbols being displayed to the user and the user being supported in his understanding of the circuit. The search for faults in a faulty circuit can also be supported hereby; for example, in the automatic analysis of the circuit diagram, missing or faulty connections between circuit elements can be recognized, such as inputs coupled to one another in pairs or outputs coupled in pairs.

In a particular embodiment, the user interface can also be used to verify the data acquired in the data structure and to repeat and/or correct the recognition of the circuit symbols, if appropriate. If the user recognizes faulty data in the display, he can make corrections by means of user dialogue. For example, the user can select a suitable button in order to allow a selection of circuit symbols to be displayed and can select one of the circuit symbols as a replacement for the previously recognized circuit symbol at the relevant location in the circuit diagram, with the result that the old circuit symbol is replaced in the entry of the data structure. In particular, the user interface can already be generated and displayed during the initial recognition of the circuit symbols, for example in order to allow unclear results of the recognition by the user to be assessed. In one example, it can be established during the recognition that a recognized circuit symbol has more or fewer outputs or inputs than the underlying filter or more or fewer outputs or inputs than recognized connections, or it can be established that different filters at the same point in the circuit diagram lead to equally strong maxima. In such cases, the user interface can highlight the location in question in the circuit diagram (frame or mark in colour) and prompt the user to make a selection of the relevant circuit symbols or configuration alternatives (suggest connections).

Circuit diagrams often contain further information on properties of the imaged circuit, for example information on a technical field of the circuit, for example electrical engineering, process engineering, fluid engineering, building engineering. Such information can be outside a region of the circuit, for example at the lateral, upper or lower image edge. Embodiments of the invention comprise steps for automatic recognition and classification of such information. For example, the technical field can be determined by automatic text recognition and compared with predetermined technical fields and a suitable one of the predetermined fields can be selected. On the basis of this field, the invention can resort to a selection of predetermined circuit symbols which are relevant to this field and stored accordingly. These circuit symbols are used in the further course in order, as explained above, to retrieve or construct filters for these circuit symbols and to detect them in the circuit diagram. This process can be configured by a user in a dialogue, for example by presentation of the relevant circuit symbols and selection of circuit symbols by the user before the recognition is carried out.

In addition to the technical field, the information mentioned can contain further technical details, for example a drawing standard used (IEC, NFPA), information on the size/scale/orientation of the circuit diagram and on the author (drawer), customer, purpose, use, project, etc. Information on the document structure can also be contained, for example DIN 61355, 81346 etc., and information on the last revision of the circuit diagram. In particular, it can also be specified that the circuit diagram comprises a plurality of pages. In this case, the invention can take measures to virtually put together (register) parts of the same circuit diagram which extend over a plurality of pages before the recognitions explained above are carried out.

From the data determined in this way relating to the connections of the circuit symbols to one another, the invention can, in one embodiment, compile an overview which displays the components contained in an ordered manner, for example alphabetically according to type, name, function. The user is thereby enabled to immediately see how many copies of a circuit symbol type (resistors, motors, etc.) are contained in the document, which functions are carried out by which switching elements, etc. The already mentioned natural language statements can be played or mapped by selecting one of these elements, so that the user reads, for example, when selecting an element with name "M3": "Motor with identifier M3 of the company Siemens and order number 3R2015 is illustrated on page 15, is secured with the fuse F2 of ABB at 32 amperes and is controlled by means of a frequency converter of the company SEW. The motor drives a rotary spindle. For the connection of the frequency converter from the switch cabinet A2, a cable with 5×2.5 mm2 cross section and double shielding is used". In this example, symbols for a motor, a fuse, a frequency converter, a rotary spindle, a switch cabinet were therefore recognized, to which the names M3, F2, A2 could be assigned by means of OCR. Further information, namely manufacturer company, order number, can have been supplemented by predefined knowledge about the relevant circuit symbols/switching elements and recognized company names. Information regarding cable cross section and shielding results, for example, from OCR analyses of the connection lines, analogously to the OCR analyses of the circuit symbols already mentioned.

Further examples of automatically generated statements about a circuit diagram: "The emergency-off switch in the field 'B4' is connected directly to the main voltage supply in 'B1'"; "The Siemens contactor '3RT2017-1BB56' from the switch cabinet 'A3' controls the signal lamp of the company 'WEKA' in field 'B1' via a 2.5 mm2 line"; "The lamp 'H3' is connected at the connection '+' directly to the PLC output card 'KF3.1' at the output &ue28098@ In the software, it can be reached via the address '16.5' and the variable 'lampe bunt'". In these examples, the symbol names B4, B1, 3RT2017-1BB56, A3, H3, KF3.1, 5, 16.5, lamp bunt originate from OCR analyses of the areas occupied by circuit symbols in the circuit diagram. The company names Siemens contactor and WEKA can be determined automatically on the basis of the respective recognized circuit symbols and their previously known manufacturers. The designations emergency-off switch, main voltage supply, switch cabinet, signal lamp, lamp, PLC output card are type designations of circuit symbols which, after recognition of these circuit symbols, can be determined from previously known information on these circuit symbols. The remaining text components are generated automatically, wherein relevant known data models are used to generate natural language formulations. The specific selection and implementation of these data models is known to the person skilled in the art and is not the subject of the invention.

Embodiments of the invention also comprise a computer-readable medium having instructions stored thereon which, when executed by a processor, carry out the steps explained above. Further embodiments of the invention comprise a computer, mobile device or the like which are equipped with a memory and a processor configured to carry out the invention explained above.

FIG. 1 shows a detail of an exemplary circuit diagram 100. The circuit diagram 100 contains a plurality of circuit symbols with inputs and outputs, for example a motor M operated with alternating current and a plurality of grounding and switches. Further, lines are shown in different embodiments.

Figure 2:
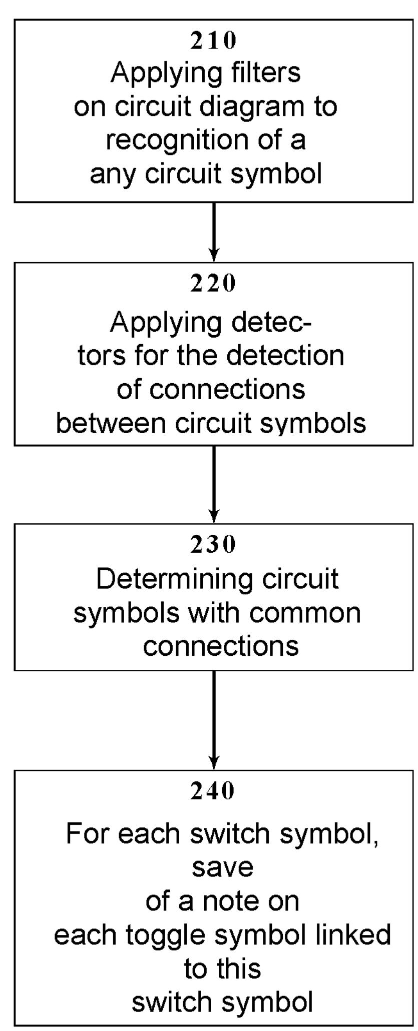
FIG. 2 shows a method according to the invention for analysis of the circuit diagram.

FIG. 2 shows a method according to the invention for automatic analysis of a circuit diagram. The circuit diagram is first converted into a raster illustration if it is present in a vector format. Then, in step 210, one or more filters for recognizing the imaged circuit symbols are applied to the circuit diagram. As already explained, each of the filters serves to identify one or more circuit symbols of a type, for example a filter for identifying capacitors, a filter for identifying coils, etc. The filters can be present, for example, in matrix form. The application can take place in the form of convolution, convolution, matrix multiplication, Fourier transformation and filtering in the frequency domain or other common measures for applying filters. The application of a filter results in a result image, preferably with the same dimensions as the circuit diagram. In the result image, locations at which the relevant circuit symbol is present with high probability in the circuit diagram are occupied with increased (lower) gray values. To identify all circuit symbols of a filter, the result image thereof is subjected to an analysis for maxima (minima). The analysis is carried out for each result image, so that finally the locations of all circuit symbols of all applied filters are known.

The recognition of the circuit symbols can be supplemented by a text recognition (OCR), in which possibly present text designations of the circuit symbols are recognized. For example, a circle or rectangle can be defined around each of the circuit symbols, in which circle or rectangle these designations are determined. The found texts are stored together with the respective circuit symbol in a suitable data structure. The texts can be classified, for example on the basis of their specific arrangement and/or size within the circuit symbol, in order to delimit the designations of inputs or outputs from designations of the entire circuit symbol. The differently classified texts are stored in the data structure in respective variables, so that for each circuit symbol the designations of the inputs and outputs as well as designation of the circuit symbol can be retrieved separately.

In step 220, connection lines between the circuit symbols are recognized. This preferably takes place by way of edge detectors, which recognize horizontal, vertical and/or inclined lines. In one embodiment, respective detectors are used for these different line types, which provide separate result images. The recognized line sections/connection segments are supplemented in a suitable way to form complete connections, and the resulting connections are brought into line with the circuit symbols in step 230; a specific implementation of these measures is explained below with reference to FIG. 3.

In step 240, the determined data are stored in the data structure. In particular, those circuit symbols which are connected to this input or output are noted for each input and output of a circuit symbol. This can be implemented for instance by means of a pointer to the relevant connected circuit symbol.

Figure 3:
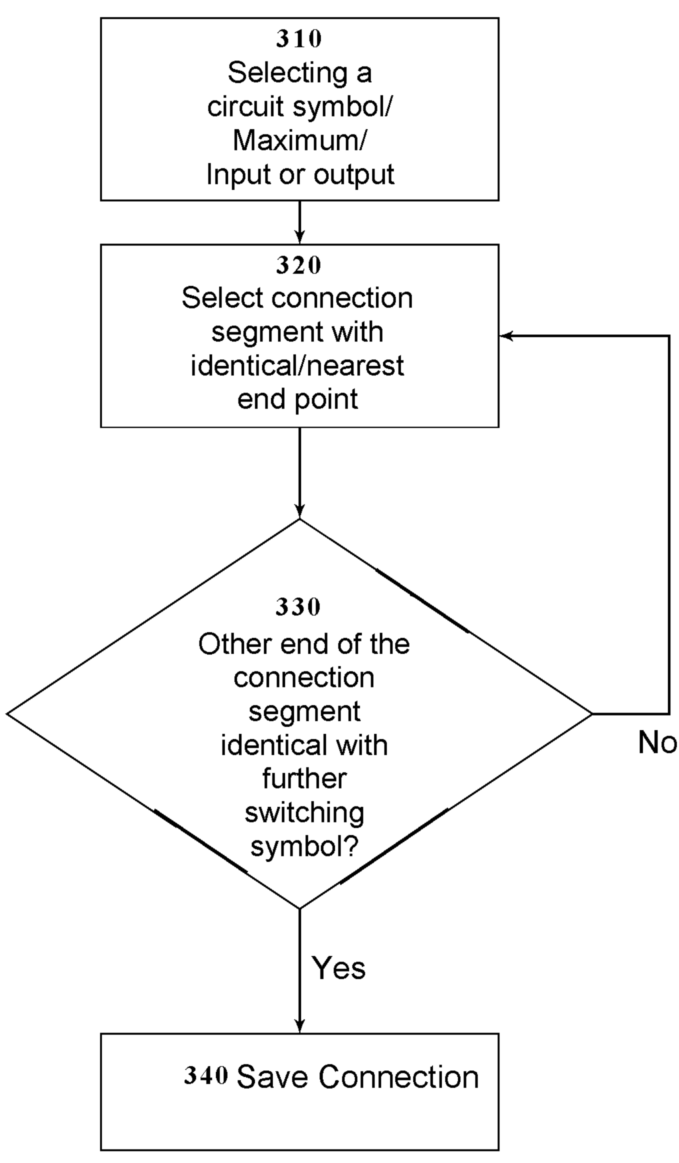
FIG. 3 shows a method according to the invention for detection of connections between circuit symbols of the circuit diagram.

FIG. 3 shows a method 300 for assignment of circuit symbols to connection lines which connect the circuit symbols to one another. The method 300 is carried out for each of the recognized maxima (minima) in the result images of step 110 in FIG. 2. In step 310, one of these maxima (minima) and the associated circuit symbol are considered. In particular, the method can be specified in that the inputs and outputs are determined for this circuit symbol and the entire method 300 is carried out separately for each of these inputs and outputs.

In step 320, the end points of the connection segments recognized in step 220 of the method 200 are considered. For example, these end points can be determined by means of vectorisation of the connection segments. Step 320 comprises identifying closest end points of the connection segments which are ideally identical to the currently considered maximum (minimum) or input or output.

Steps 320 and 330 form a loop for constructing a complete connection line from the determined connection segments. Firstly, in step 330 it is checked whether the other end of the connection segment selected in step 320 is connected to a further one of the recognized circuit symbol maxima (minima) or the inputs or outputs thereof. In this case, the loop has already ended, and a complete connection line is recognized; this is established in step 340. In the data structure, the respective other circuit symbol is noted for each of the two circuit symbols, preferably in connection with the respective input or output.

If, however, it is established in step 330 that the other end of the connection segment is not identical to or within a threshold distance from a further circuit symbol maximum (minimum) or input or output, the method 300 returns to step 320. Here it is checked which of the remaining connection segments has a common end point with the currently considered connection segment. To take into account any inaccuracies in the recognition, a threshold distance can also be used here. The loop 320, 330 is carried out until a maximum (minimum)/circuit symbol or input or output of a circuit symbol has been determined as the end point of the connection line as the end point of the last considered connection segment. The result is stored in the data structure in step 340.

The invention thus enables an automatic and complete analysis of a circuit diagram in that it determines imaged circuit symbols and their connections to one another by means of image processing, in particular pattern recognition, and stores these data, including textual designations, in a data structure. As a result, all information on the topology of the imaged circuit is present and can be used to make further statements on the functioning of individual circuit elements and of the entire circuit. Such statements also comprise natural language statements which support the user in understanding the circuit and can ideally be used to automatically generate documentation. Users can intervene in the explained methods in that they control the respective recognition steps by means of dialogues; such dialogues can be displayed either on the initiative of the user or in the case of borderline cases (a plurality of circuit symbols at one location, a plurality of connections per input or output, missing identifiers for specific circuit elements or inputs/outputs).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for automatic analysis of a circuit diagram, comprising:

applying one or more filters to a circuit diagram for recognizing a circuit symbol defined by the respective filter in the circuit diagram, wherein each filter stores only the end points and/or corner points of edges of the respective circuit symbol;

applying one or more detectors to the circuit diagram for recognizing connections between the circuit symbols;

determining those recognized circuit symbols which are coupled to one another by means of the recognized connections; and for each of the detected circuit symbols, storing an indication in a data structure of the detected circuit symbol of each further circuit symbol coupled to this detected circuit symbol.

2. The method according to claim 1, further comprising: generating a natural language formulation from one of the data structures, wherein the natural language formulation specifies a function of one of the recognized circuit symbols which is exerted by the circuit symbol on the circuit symbols coupled to this circuit symbol, or which are exerted on the circuit symbol by the circuit symbols coupled to this circuit symbol.

3. The method according to claim 2, wherein the function of a circuit symbol is predefined in the data structure, and wherein a function which is exerted on this circuit symbol by a coupled circuit symbol is determined by looking up this function in the data structure of the coupled circuit symbol.

4. The method according to claim 1, wherein the filter is a grayscale image or a bitmap which represents corners of a symbol as gray values or as set bits.

5. The method according to claim 1, further comprising producing the one or more filters to identify a respective circuit symbol, wherein producing a filter comprises:

applying one or more edge detectors to a representation of a circuit symbol to highlight horizontal, vertical and diagonal edges; and determining end points of the horizontal, vertical and diagonal edges, and storing a corresponding bit or a corresponding gray value in a bitmap or a grayscale image as a resulting filter.

6. The method according to claim 1, further comprising classifying the recognized circuit symbols after applying the filters.

7. The method according to claim 6, wherein the user is prompted to make a selection from a plurality of circuit symbols whose filters indicate the presence of these circuit symbols at a location in the circuit diagram.

8. The method according to claim 1, further comprising identifying a technical discipline of the circuit diagram contained in a document containing the circuit diagram, and determining a set of circuit symbols and associated filters associated with the technical discipline to be used for automatic analysis of the circuit diagram.

9. The method according to claim 1, wherein the one or more detectors are edge detectors.

10. A non-transitory computer-readable medium having instructions stored thereon which, when executed by a processor, carry out the method according to claim 1.

11. A device comprising:

a memory; and a processor coupled to the memory and configured to carry out the method according to claim 1.

* * * * *